United States Patent [19]

Mäkimaa

[11] 4,442,479
[45] Apr. 10, 1984

[54] INVERTER WITH SATURABLE REACTOR PROTECTION CIRCUIT

[75] Inventor: Tapani Mäkimaa, Lahti, Finland

[73] Assignee: Kemppi Oy, Lahti, Finland

[21] Appl. No.: 345,150

[22] Filed: Feb. 2, 1982

[30] Foreign Application Priority Data

Feb. 13, 1981 [FI] Finland ................... 810456

[51] Int. Cl.³ .......................................... H02M 7/515
[52] U.S. Cl. ...................................... 363/136; 363/58
[58] Field of Search ................ 363/57, 58, 96, 135, 363/136, 27, 28

[56] References Cited

U.S. PATENT DOCUMENTS

| | | | |
|---|---|---|---|
| 3,448,367 | 6/1969 | Corey | 363/58 |
| 3,466,528 | 9/1969 | Adams | 363/136 |
| 3,470,449 | 9/1969 | Risberg | 363/135 |

*Primary Examiner*—William H. Beha, Jr.
*Attorney, Agent, or Firm*—Pennie & Edmonds

[57] ABSTRACT

An improved D-C to A-C inverter circuit is provided including push-pull sequentially activated thyristor switches connected across a center-tapped D-C voltage source with a saturable reactor connected in series between each thyristor and the center-tap return branch and at least one saturable reactor connected in the center-tap return branch to effectively reduce peak operating voltages.

1 Claim, 2 Drawing Figures

INVERTER WITH SATURABLE REACTOR PROTECTION CIRCUIT

BACKGROUND OF THE INVENTION

1. Field of the Invention

The present invention relates to an inverter circuit of the type comprising a DC voltage source which itself has a center-tap or which has a center-tap in a voltage divider circuit connected across the source, and two serially connected thyristor switches which are in the forward direction connected across the DC voltage source and each of which has an RC protection connected across the thyristor and a commutation diode antiparallel with the thyristor, and a reactor connected in series with the thyristor, in which case a center branch which includes at least one reactor branches out from a point between the thyristor switches to the said center-tap.

2. Description of the Prior Art

Ever since the advent on the market of thyristors or silicon controlled rectifiers as components they have been used quite extensively in inverter circuits. The present invention relates in particular to an inverter circuit in which thyristors are used in conjunction with saturable reactors. It is therefore appropriate to note that the use of saturable magnetic components in rectifier and inverter technology is not new in itself. Saturable reactors are used commonly for protecting valves (diodes, thyristors and Hg-valves) from excessive rates of change in current and voltage, as shown in the detailed description below. Premagnetized reactors and magnetic amplifiers have also been used in rectifier and inverter technology for decades. Reference is made here to the accompanying list of publications.

| | List of References | |
|---|---|---|
| /1/ | U.S. Pat. No. | 3,324,380 |
| /2/ | U.S. Pat. No. | 3,321,695 |
| /3/ | SE Lay-Open Print | 316,862 |
| /4/ | SE Patent | 227,486 |
| /5/ | GB Patent | 1,407,594 |
| /6/ | GB Patent | 1,360,112 |
| /7/ | CH Patent | 475,669 |
| /8/ | CH Patent | 467,549 |
| /9/ | U.S. Pat. No. | 2,635,222 |
| /10/ | U.S. Pat. No. | 2,857,563 |
| /11/ | Seeling, T. | Thyristorwechselrichter mit sattigbaren Drosseln fur Mittelfrequenzanwendungen IEEE Trans. on Magnetics, Vol. MAG-2, No. 3, September 1966 |
| /12/ | Min. B. J. Wearsch, H. W. | An Improved Snubber Circuit for Power Semicoductors IAS 77, Annual |
| /13/ | Meyer, Manfred | Beanspruchung von Thyristoren in selbstgefuhrten Stromrichtern Siemens Zeitschrift Mai 1965, Heft 5 |
| /14/ | | Technische Mitteilungen 4, 5 9 AEG. |

For example, reference /14/ discloses the use of saturable reactors for reducing the turn-on and turn-off losses of thyristors. The same subject is also dealt with in references /5/, /8/ and /13/. The use of saturable reactors for voltage increase rate protection is dealt with in, for example, references /2/, /5/ and /12/.

Saturable reactors have further been used for equalizing the turn-on delays of thyristors connected in parallel /4/ and also in series connections for the equalization of voltage division when thyristors turn on /7/.

Reference /11/ discloses a method, substantially in accordance with the Morgan principle, for increasing the effective frequency of a resonance inverter, and references /1/ and /10/ disclose applications of magnetic amplifiers.

The circuit according to accompanying FIG. 1 is discussed below; it is made up of batteries $P_1$ and $P_2$, thryistors $T_1$ and $T_2$, protecting coils $L_k$, RC protections $R_1 C_1$, commutation capacitor C, main inductance $L_p$, leakage inductance $L_\sigma$, as well as load $R_L$ and commutation diodes D1 and D2. The purpose of the protecting coils $L_k$ is to protect the thryistors $T_1$ and $T_2$ from excessive rates of current increase and, together with the RC protections, from an excessive rate of voltage increase. $L_p$ together with C forms the actual commutation circuit, the purpose of which is to turn off the thyristor, as known from the literature (Bedford-Hoft: Principles of Inverter Circuits).

When the frequency is low (less than 1 kHz), $L_k$ $C_1 R_1$ can easily be dimensioned so that, when nowadays generally available thyristors are used and E is 500–600 V (a 380 V voltage rectified with a three-stage bridge), the allowed dV/dt and dI/dt values of the thyristor will not be surpassed and, on the other hand, the losses of the RC protections remain moderate. When the frequency increases, the coils $L_p$, $L_\sigma$ and $L_k$ and the capacitor C must be decreased. As a result, the dI/dt and dV/dt of the thyristors increase if $R_1$ and $C_1$ remain constant since, as known, $$\frac{dV}{dt} \max \simeq \frac{E}{2L_k} R_1 \qquad (1)$$

As evident from (1), the problem can be corrected by decreasing $R_1$, but as a result $C_1$ must be increased in order that the circuit $2L_k$ $R_1$ $C_1$ remain sufficiently attenuated and not cause voltage spikes. If a critically attenuated resonance circuit is taken as the criterion, the value obtained for C is $$C_1 = \frac{8L_k}{R_1^2} \qquad (2)$$

i.e., the increasing of $C_1$ follows from the decreasing of $R_1$. Since the power loss of the RC protections is of the form $$P_{loss} \sim E^2 f C_1 \qquad (3)$$

the power loss increases quite rapidly when the frequency increases. The absolute value of the power loss is strongly dependent on the requirements set and on the components available. In the example case presented below, the tolerable limit in practice is below 5 kHz. In addition, it is advisable to keep in mind that a thrysistor will not tolerate all kinds of RC protection. Manufacturers often give an upper limit for $C_1$ and a lower limit for $R_1$. For this reason the frequency cannot be increased indefinitely even at the expense of losses from the RC protection.

One known method to make simultaneously possible the small coils $L_k$ required by a high frequency and the high inductances of $L_k$ required by small losses is to make the coils $L_k$ saturable. This is based on the fact that, during actual operation, the currents are so high that $L_k$ is in a saturated state and its inductance is small, thereby allowing a rather high frequency.

Instead, when the RC protections $R_1C_1$ are operating, the current of the coil $L_k$ concerned is low, in which case the coil is in an unsaturated state and its inductance is high, in which case, on the basis of (1), $dV/dt$ is small and, as can be seen from (1) and (2), C can be maintained small, in which case losses are small. In practice the inductance of $L_k$ in the unsaturated state can be as high as 500 times its inductance in the saturated state, and even greater changes are possible. This method has, however, a serious disadvantage, as shown below.

If it is assumed that $T_1$ has just ceased conducting and I is commutating to $D_1$ in a conventional manner, in this situation the voltage of $U_c$ is at its maximum and $L_k$ is in an unsaturated state, in which case its inductance is typically of the order of 100–200 $\mu H$.

In this case the voltage of point A gainst B, i.e. in practice the voltage effective across $T_2$, may rise very high since $$U \simeq E + \left(U_c - \frac{E}{2}\right) \frac{L_k}{L_p + L_k} ; (R_L = \infty) \quad (4)$$

When, on the basis of the above, $E/2 \simeq 300$ V and the voltage $U_c$ of capacitor C, e.g. $\simeq 800$ V, are substituted $$U \simeq 600V + (800V - 300V) \frac{200 \mu H}{250 \mu H} = 1000V$$

is obtained.

The significance of the matter increases because, when the order of the voltage of the thyristor increases, the highest speeds of the thyristors decrease, and thus, when the aim is to use high frequencies, it is necessary to use thyristors of relatively low voltages. On the other hand, connecting thyristors in series in an expensive and technically rather difficult solution.

SUMMARY OF THE INVENTION

The object of the present invention is to eliminate the above-mentioned problem, i.e. to reduce the voltage peak involved when saturable reactors are used. In order to achieve this, the invention provides an inverter circuit of the type once described, wherein each of the reactors connected in series with the thyristors is of saturable type and, additionally, also the reactor in said center branch includes at least one saturable reactor. Advantageously, the reactor of the center branch is made up of a series connection of a constant-size reactor and a saturable reactor.

DESCRIPTION OF THE PREFERRED EMBODIMENT

Figure 1:
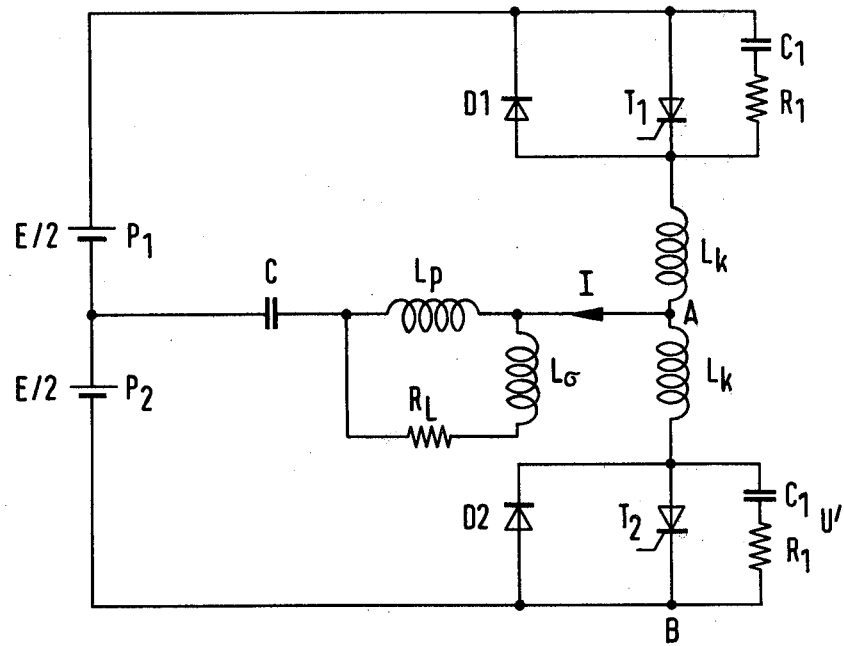
FIG. 1 depicts the already described known circuit.
Figure 2:
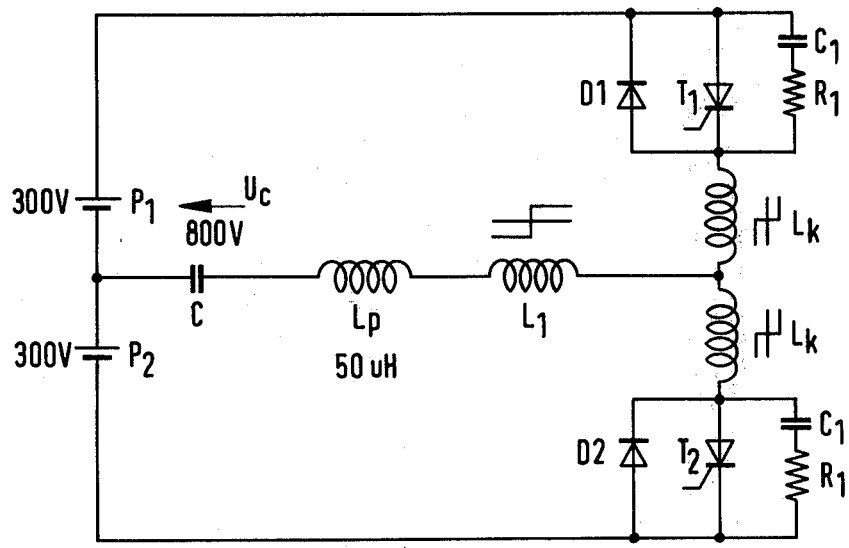
FIG. 2 depicts a circuit according to the present invention.

The circuit according to FIG. 2 is in other respects similar to that according to FIG. 1, in which thus reactors $L_k$ can also be saturable, but according to the present invention, in FIG. 2 there is a third saturable reactor $L_1$ connected in series with the center branch $L_p$ of the circuit.

When this reactor $L_1$ is dimensioned so that, regardless of the current, $$L_1 = k L_k \quad (5)$$

where k is a suitable constant, the voltage spike can be eliminated almost completely.

If, for example $L_K$ is the same as in the previous example, and in Formula (5) k=3, by substituting in (4) we obtain $$U \simeq E + \left(V_c - \frac{E}{2}\right) \frac{L_k}{L_p + L_k + L_l}$$

$$= 600V + (800V - 300V) \frac{200 \mu H}{50 \mu H + 200 \mu H + 600 \mu H}$$

$$\simeq 718V$$

i.e. the voltage peak has dropped almost 30 %. Here it should be noted that the voltage of C can be even much higher that the above-mentioned 800 V, in which case the advantage gained by using a saturable additional reactor $L_1$ becomes even more emphasized.

Thus, by applying the circuit according to the invention the voltage increase rate of thyristors can be reduced without increasing their voltage strain or the power loss of the RC protection. This means also in practice that the technical-economic maximum operating frequency of the thyristors can be increased, even multiplied.

Finally, it should be pointed out that the circuits of FIGS. 1 and 2 in part only show the principle. In practice there is usually only one source of voltage E, and across this source there has been connected a voltage divider consisting of, for example, two capacitors, and the center point of the voltage divider serves as the said center-tap. The reactor $L_p$ for its part may be made up of, for example, the primary winding of a transformer.

What is claimed is:

1. An inverter circuit comprising a DC voltage source provided with a center tap in the source itself or in a voltage divider circuit connected across the source;
   two thyristor switches connected in series in the forward direction across the DC voltage source;
   two RC protection circuits, each one being connected across one of the thyristors, respectively;
   two commutation diodes, each one being connected antiparallel with one of the thyristors, respectively; and
   two reactors, each one being saturable and connected in series with one of the thyristors, respectively, a center branch branching out from a point between the thyristor switches to said center tap, said center branch including at least one capacitor and at least one saturable reactor.

* * * * *